Figure 1:
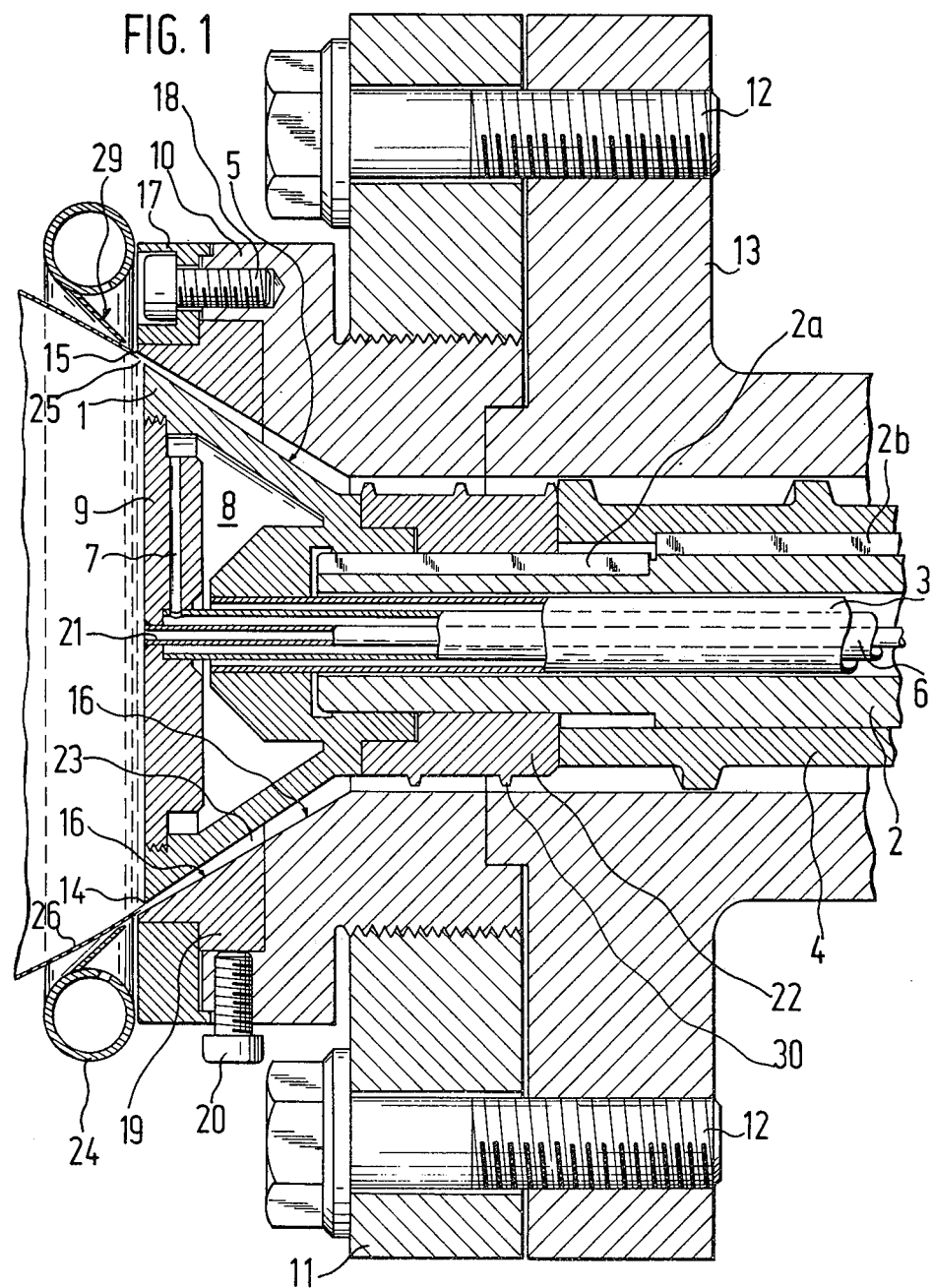

United States Patent [19]

Andersen et al.

[11] 4,021,170

[45] May 3, 1977

[54] EXTRUDER WITH BLOW HEAD

[75] Inventors: Heinz-Erhardt Andersen, Burgkirchen, Alz; Georg Stangl, Ehring, both of Germany

[73] Assignee: Hoechst Aktiengesellschaft, Frankfurt am Main, Germany

[22] Filed: May 17, 1976

[21] Appl. No.: 686,927

[30] Foreign Application Priority Data

May 21, 1975 Germany ..................... 2522357

[52] U.S. Cl. .................. 425/72 R; 425/376 B; 425/466; 264/209; 264/312
[51] Int. Cl.² ..................................... B29D 23/04
[58] Field of Search ............... 425/72, 376, 466; 264/209, 312

[56] References Cited

UNITED STATES PATENTS

| | | | |
|---|---|---|---|
| 3,327,038 | 6/1967 | Fox | 425/466 X |
| 3,331,103 | 7/1967 | Fox | 425/72 |
| 3,410,933 | 11/1968 | Moseley, Jr. | 425/466 X |
| 3,560,600 | 2/1971 | Gliniecki | 425/72 X |
| 3,944,641 | 3/1976 | Lemelson | 425/466 |
| 3,966,377 | 6/1976 | Upmeier et al. | 425/72 R |

*Primary Examiner*—Robert L. Spicer, Jr.
*Attorney, Agent, or Firm*—Connolly and Hutz

[57] ABSTRACT

Extruder with blow head comprising a cylindrical body containing at least one rotating screw in coaxial position, a feeding device for the thermoplastic material near one end of the cylinder and a blow head comprising a housing and a mandrel at the other end of the cylinder forming a slit tapering in the direction of flow of the plasticized material and through which said material issues, the screw and the blow head being arranged in one plane, and directly behind the blow head a cooling device for cooling the extruded tube, wherein a. the screw and the mandrel are rigidly connected with each other without any distortion being possible,
b. the lip of the housing of the blow head protrudes from 0.1 to 10 mm over the lip of the mandrel,
c. the diameter of the slit formed by the housing and the mandrel is in the range of from 1 to 20 mm in the most narrow area, and
d. the surface of the housing facing the surface of the mandrel has a higher adhesion to the passing plasticized thermoplastic material than the said surface of the mandrel.

6 Claims, 3 Drawing Figures

EXTRUDER WITH BLOW HEAD

This invention relates to an extruder consisting of a cylindrical body containing at least one rotating screw in coaxial position, a feeding device near one cylinder end for the thermoplastic material and at the other end a blow head comprising the blow head housing and the mandrel forming a converging slit in the direction of flow for the outlet of the plasticized material, said screw and the blow head being positioned in one plane, and the blow head is immediately followed by a cooling device for cooling the extruded tube.

Extruders with blow head of this type are described, for example, in the monography by Gerhard Schenkel "Kunststoff-Extrudertechnik", Carl Hanser Verlag Munich, 1963 (cf. page 75 in connection with pages 380, 387, 388 and 389). These extruders with blow head have, however, the drawback that they contain areas and spaces hindering a uniform flow of the material. The flow of the material is impeded, for example, by rods supporting the mandrel in the housing. In the transition zone between the screw end and the mandrel, especially behind the tip of the screw and before the beginning of the mandrel, there are areas in which the thermoplastic material flows at very different speed or locally does practically not flow.

In such areas the material is forcibly subjected to a longer thermal stress which may lead to decompositions even with a relatively high degree of stabilization.

The unfavorable flow conditions for the thermoplastic material in known extruders with blow head have the disadvantage that thermally less stable moldable compositions, for example, those on the basis of polyvinyl chloride, can be extruded only with the use of relatively high amounts of processing auxiliaries, especially stabilizers. Hence, it is not possible, for example, to process on extruders of this type certain moldable compositions on the basis of polyvinyl chloride intended for calendering, as these compositions contain a much smaller proportion of processing auxiliaries, such as stabilizers, lubricants and flow improving agents, than required for extrusion. In order that the cheap polyvinyl chloride compositions suitable for calendering can be also processed on the known extruders with blow head the said extruders must have improved flow conditions to reduce the thermal stress of the material on its way through the extruder.

It is, therefore, the object of the present invention to provide an extruder with blow head in which better conditions of flow of the thermoplastic material are ensured as compared to known extruders with blow head and in which the thermal stress of the material is substantially reduced.

The extruder with blow head according to the invention is characterized in that a. the screw and the mandrel are rigidly connected in a manner such that no distortion can occur,
b. the lip of the blow head housing protrudes 0.1 to 10 mm over the lip of the mandrel,
c. the slit through which the material issues has a diameter of 1 to 20 mm, and
d. the surface of the blow head housing facing the surface of the mandrel has a higher adhesion to the passing plasticized thermoplastic material than the said outer surface of the mandrel.

An advantageous rigid connection of screw and mandrel without distortion can be achieved, for example, by making the screw and the mandrel from a single work piece, for example of stainless steel, or by welding the mandrel on the screw, or by connecting the mandrel and the screw by keying or screwing.

The lip of the blow head housing shall protrude 0.1 to 10 mm, preferably 0.5 to 3 mm, over the lip of the mandrel. The slit formed by the blow head housing and the mandrel, which tapers in the direction of flow, has a diameter of from 1 to 20 and preferably 3 to 8 mm in the most narrow area (material outlet). The width of the slit in this area is preferably a little larger than the width of the slits normally used in the manufacture of blown tubes with known extruders.

The higher surface adhesion of the surface of the blow head housing facing the surface of the mandrel for the plasticized thermoplastic material flowing along said surfaces can be obtained by a different construction of the two surfaces. The surface of the housing may have a rougher structure than the surface of the mandrel. In this case the surface of the housing should have a peak-to-valley height which is preferably 5 to 20 $\mu$ higher than that of the surface of the mandrel. According to another embodiment of the invention, the two surfaces are made of materials having different adhesive forces with respect to the thermoplastic material. The surface of the mandrel is preferably made of polytetrafluoroethylene on which plasticized material slides especially smoothly and the surface of the housing is made of stainless steel on which the material has a higher adhesion. According to a further advantageous embodiment the surface of the housing is provided with grooves or channels ending at a distance of at most 25 mm from the nozzle lips, which grooves preferably have semicircular cross sections with a radius of approximately 3 mm. A smaller sliding effect on the surface of the housing can also be obtained by heating the said surface to a higher temperature than the surface of the mandrel. Depending on the type of the thermoplastic material, the temperature difference is more or less large, it is preferably in the range of from 5° to 70° C; for thermoplasts on the basis of vinyl chloride it is at about 20° C and for polyethylene at about 50° C. To obtain a smaller sliding effect of the material on the surface of the housing with respect to the surface of the mandrel several of the aforesaid embodiments and structures should preferably be combined.

Suitable cooling devices for the tube are the known cooling devices and cooling media normally used for cooling the tube at a temperature below its freezing point. The known cooling rings (as described in the cited monography, pages 387 to 389) proved to be especially advantageous, with which a cooling gas, for example air, is blown onto the surface of the tube. The cooling ring is mounted at the outlet of the tube from the blow head, preferably in a position such that the cooling air issuing from the cooling ring hits the tube as soon as it leaves the nozzle slit and cools it. By cooling the tube is stiffened immediately after leaving the slit and a possible distortion during flattening of the tube is avoided. The degree of cooling, measured on the outer surface of the tube, for example, at a distance of about 3 cm from the material exit, should be in the range of from about 3 to 20, preferably 5° to 10° C, as compared to the issuing temperature of the material.

In the blow extruder according to the invention the screw and the mandrel can have the same shape as in known extruders with blow head. According to a preferred embodiment, the mandrel has a length of at most 200 mm, advantageously 20 to 100 mm, and the screw has a flight depth which is by 5 to 30%, preferably 10 to 20%, smaller in the last screw section over a length corresponding to 1 to 3 times the cylinder diameter than in the metering zone and a diameter which is by 20 to 90%, preferably 25 to 50%, smaller than the corresponding cylinder diameter. The ribs, preferably having the shape of a wedge, have a breadth of at most 2 mm at the peak.

The term "thermoplastic materials" generally means all plastic materials of the group of thermoplasts as far as they can be processed into tubular sheeting by the blowing process and to flat sheets by calendering. Preferably used are homopolymers of vinyl chloride, copolymers of vinyl chloride with suitable other monomers and graft polymers on the basis of vinyl chloride or polyvinyl chloride, as well as mixtures of the aforesaid polymers.

The extruder with blow head in accordance with the invention is characterized by a combination of several individual features and, as compared to known extruders with blow head, it offers a series of important advantages. Owing to the rigid connection without distortion of the screw and the mandrel the blow head and the transition zone from the screw to the mandrel are free from spaces, zones, or inserts, for example, supporting bars for the mandrel, which would hinder the flow of the material. It is furthermore possible to use a relatively short blow head as compared to known blow heads, calculated on the nozzle diameter. When, in addition to the connection according to the invention of screw and mandrel, a relatively short mandrel is used having, for example, a length of 20 to 100 mm only, the material flows in the extruder without formation of dead zones (spaces or points in which the material practically comes to a standstill or is in motion without advancing in the direction of flow), shorter residence times of the thermoplastic material in the extruder are sufficient and in the slit of the nozzle the material is subjected to the shearing forces for a shorter period of time.

With the extruder according to the invention with rigid connection with direct contact of screw and mandrel a speed of rotation of the screw as required in known extruders with blow head would produce a rotating tube since the mandrel has the same speed of rotation as the screw. This undesired rotation, which could involve distortion and, hence, tearing of the extruded tube, is avoided according to the invention by features (b) to (d).

The extruder according to the invention can be a single screw or a multiple screw extruder, in the latter case with one of the screws being elongated to a discharge screw.

The extruder of the invention is particularly suitable for the preliminary gelling of thermoplastic materials with thorough plasticization. A special advantage resides in the fact that the extruder can be used for gelling and extruding compositions on the basis of vinyl chloride without a higher stabilization than for calender processing being necessary. The tubular sheeting obtained in the form of a well plasticized thermoplastic material is preferably fed, while still hot, to a calender on which flat sheeting is produced therefrom. It is expedient that the distance between the exit of the tube from the blow head and the pair of draw-off and flattening rolls is relatively short, for example, corresponds to three to five times the largest outer diameter of the mandrel. This type of calender feeding offers further advantages for the calendering process. On the one hand, homogeneously plasticized and relatively thin sheets are fed to the calender so that a high homogeneity of the material is ensured in the first roller gap, which is desirable with regard to the mechanical and optical properties of the final sheeting; on the other hand, in this manner preliminary sheets of different widths (tubular sheets) can be fed to the calendar whereby final sheets of different widths can be produced on the calender without additional equipment.

Figure 2:
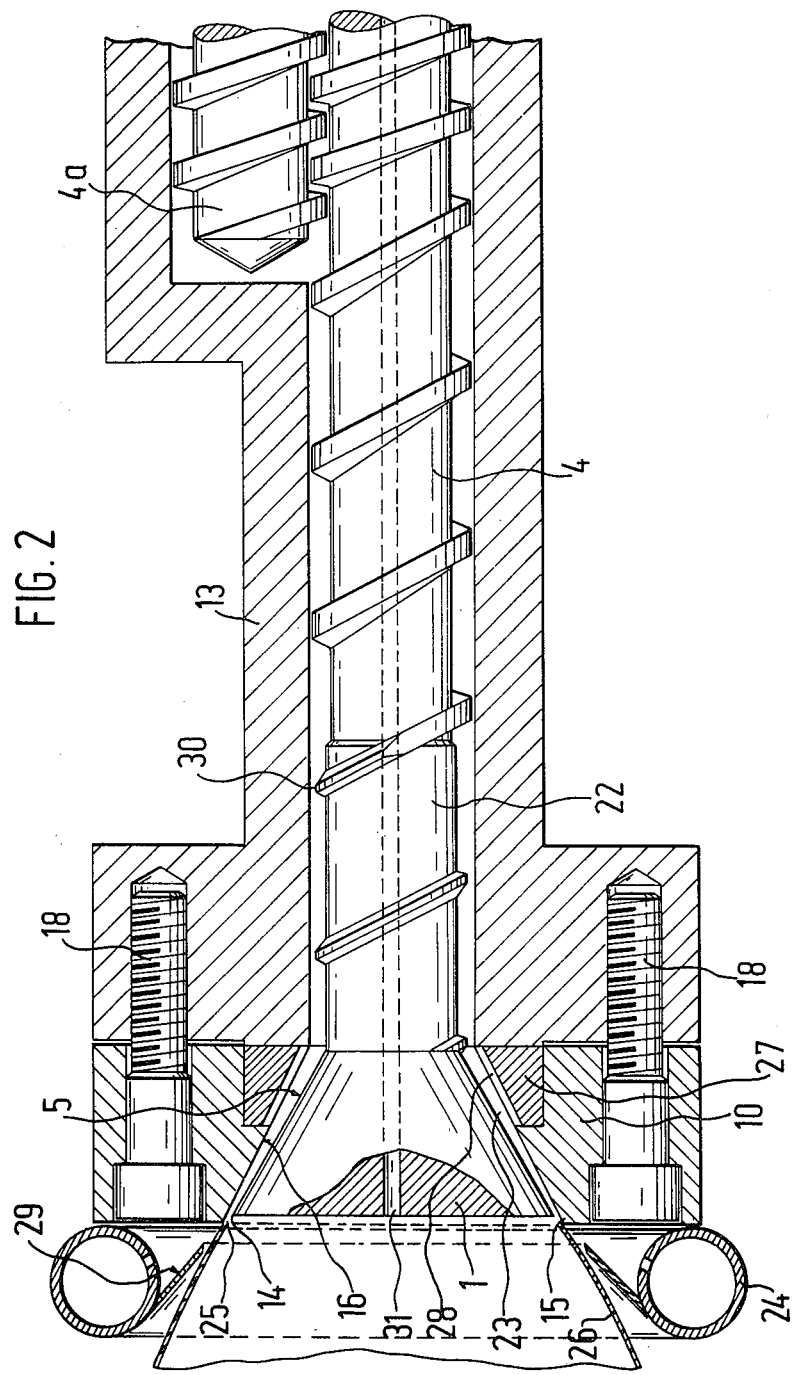
Figure 3:
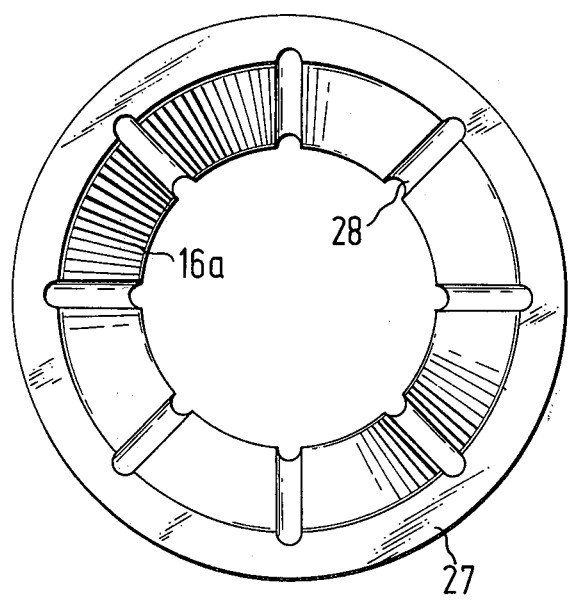

The invention will now be described in further detail by way of example with reference to the accompanying drawings in which FIG. 1 is a longitudinal view of an extruder with blow head according to the invention, FIG. 2 is a longitudinal view of another extruder with blow head according to the invention with two screws, and FIG. 3 is a sectional view of part 27 of FIG. 2.

Referring to the drawings, in the extruder represented in FIG. 1 the coolable mandrel 1 is rigidly connected with mutual contact with screw elements 4 and 22 (4 not being represented in full length) by splined shaft 2, the two wedges 2 a and 2 b and tubular tie rod 3 and thus the mandrel and the screw are driven with the same number of revolutions. Mandrel 1 has a smoothed and polished surface 5.

The cooling medium is fed to cooling chamber 8 through pipe 6 and bore 7, which cooling chamber is formed by mandrel 1 and covering plate 9. The cooling medium is led off through tubular tie rod 3. The nozzle body 10, 19, consisting of housing 10 and nozzle ring 19, is fastened on cylinder 13 by flange 11 and screws 12 (only the last portion on the outlet side of the cylinder is shown which is sufficient for the understanding of the invention, the feeding device is not shown at all). The nozzle lip 15 protrudes 1 mm over the lip 14 of the mandrel 1. The housing 10 and ring 19 have a roughened surface 16 with an average peak-to-valley height of 8 $\mu$. Nozzle ring 19 is pressed against housing 10 by supporting ring 17 and screws 18, it can be shifted in radial position by screws 20 to adjust the sheet thickness. The air required for blowing up the tube 26 is supplied through tube 21. The end section of the screw has a flight depth which is by 15% more shallow than the flight depth in section 4 (metering zone) of the screw. The diameter of section 22 of the screw is approximately 25% smaller than that of the corresponding cylinder section. The wedge-shaped ribs 30 in screw section 22 have a much lower height (20%) and a smaller breadth (1.5 mm at the peak of the rib) than the wedge-shaped ribs of screw section 4. Screw section 22 serves to facilitate the flowing together of the material, divided by the ribs of the screw in section 4 before it enters nozzle slit 23. The lips 15 of the nozzle are provided with a cooling ring 24 with baffle plates 29 to blow cooling air onto the tube 26 issuing from nozzle exit 25.

In the double screw extruder represented in FIG. 2, screw 4 of the pair of screws 4 and 4 a has the function of a discharge screw. Screw 4 with screw section 22 and mandrel 1 are made from one work piece. The lip 15 of the housing 10 and 27 protrudes 3 mm over the lip 14 of the mandrel 1. The slit 23 formed by mandrel 1 and the inner surface of housing 10 and 27, which tapers in the direction of flow of the material, has a diameter of 5 mm at the material exit 25. Surface 16 of housing element 27 is provided with grooves 28, as shown in FIG. 3, with semicircular cross section having a radius of 2.5 mm, whereby the said surface acquires a higher coefficient of friction for the thermoplastic material than the polished surface 5 of mandrel 1. In addition, surface 16 of housing 10 is rougher than surface 5 of the mandrel. The cooling ring 24 with baffle plates 29 is mounted on the blow head in a manner such that the cooling air is blown onto tube 26 immediately after its exit from nozzle slit 25. The flight depth of the screw in section 22 is by 20% more shallow than the depth in section 4 (metering zone) and the diameter of screw section 22 is by 30% smaller than the diameter of the corresponding cylinder section. The peaks 30 of the ribs in screw section 22 have a breadth of 2 mm. The blowing air is supplied through bore 31.

FIG. 3 illustrates the grooves 28 with semicircular cross sections at a distance of 45° from one another and having a radius of 2.5 mm.

What is claimed is:

1. Extruder with blow head comprising a cylindrical body containing at least one rotating screw in coaxial position, a feeding device for the thermoplastic material near one end of the cylinder and a blow head comprising a housing and a mandrel at the other end of the cylinder forming a slit tapering in the direction of flow of the plasticized material and through which said material issues, the screw and the blow head being arranged in one plane, and directly behind the blow head a cooling device for cooling the extruded tube, wherein
    a. the screw and the mandrel are rigidly connected with each other without any distortion being possible,
    b. the lip of the housing of the blow head protrudes from 0.1 to 10 mm over the lip of the mandrel,
    c. the diameter of the slit formed by the housing and the mandrel is in the range of from 1 to 20 mm in the most narrow area, and
    d. the surface of the housing facing the surface of the mandrel has a higher adhesion to the passing plasticized thermoplastic material than the said surface of the mandrel.

2. Extruder with blow head as claimed in claim 1, wherein the peak-to-valley height of the said surface of the housing is by 5 to 20 $\mu$ larger than that of the said surface of the mandrel.

3. Extruder with blow head as claimed in claim 1, wherein the said surface of the housing is made of stainless steel and the said surface of the mandrel is of polytetrafluoroethylene.

4. Extruder with blow head as claimed in claim 1, wherein the said surface of the housing is provided with grooves and the said surface of the mandrel is smooth.

5. Extruder with blow head as claimed in claim 1, wherein the said surface of the housing has a temperature which is by 5° to 70° C higher than the temperature of the said surface of the mandrel.

6. Extruder with blow head as claimed in claim 1, wherein the mandrel has a length of from 20 to 100 mm, the end section of the screw has a flight depth which is by 10 to 20% more shallow than the depth in the preceding section of the screw, the diameter of the end section of the screw is by 25 to 50% smaller than the diameter of the corresponding section of the cylinder and the ribs in the end section of the screw have a breadth of at most 2 mm.

* * * * *